Patented Dec. 10, 1946

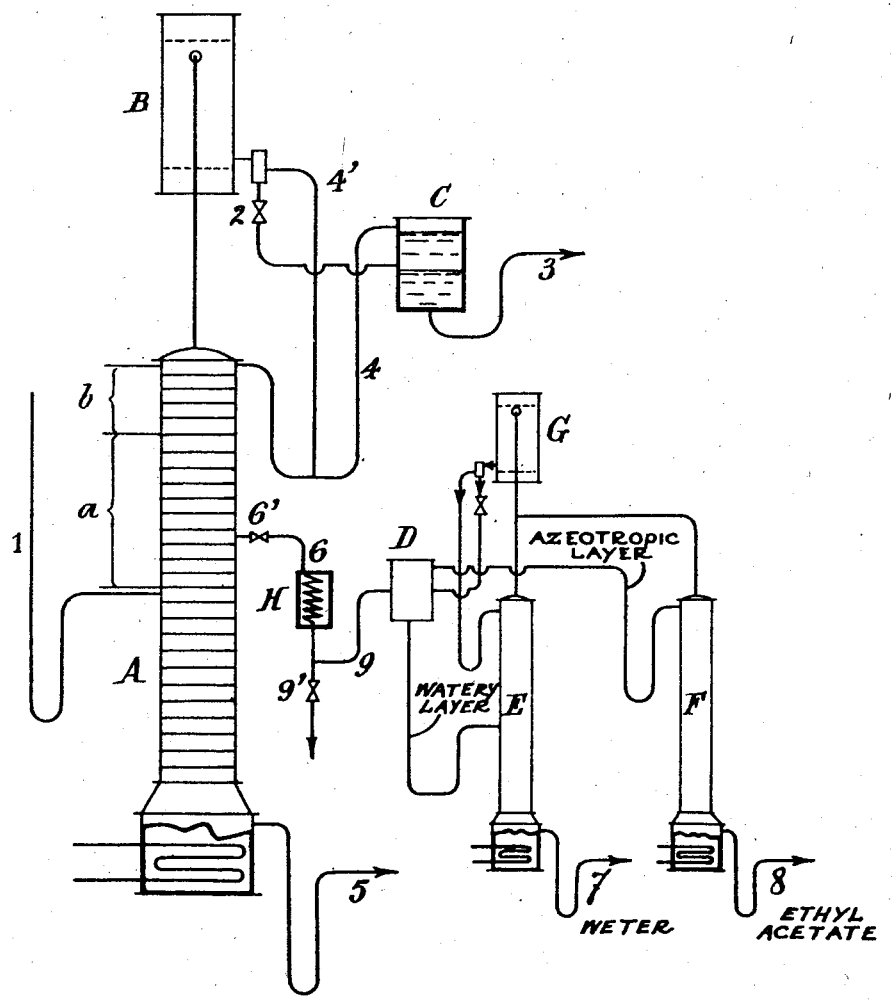

2,412,215

UNITED STATES PATENT OFFICE 2,412,215

DEHYDRATION OF ACETIC ACID BY AZEOTROPIC DISTILLATION

Henri Martin Guinot, Niort, France; vested in the Alien Property Custodian

Application January 8, 1941, Serial No. 373,689
In France January 13, 1940

5 Claims. (Cl. 202—42)

In the application for a patent in the United States of America, Serial No. 319,762, filed February 19, 1940, the applicant has described a process of continuous dehydration of acetic solutions, possibly containing anhydride. Such process consists in employing a mixed carrying liquid once for all placed in the column and containing, on the one hand, an acetic ester, such for example as ethyl acetate, and, on the other hand, an auxiliary carrying liquid insoluble in water and forming therewith a heterogeneous azeotropic mixture having a boiling point lower that of the azeotrope ester-water. In this way there are constituted in the normally running column two distinct zones situated above the feed inlet for the products to be dehydrated. In one of these zones operates the ester which has for its object to prevent acid and anhydride from rising to the top of the column, while in the other zone operates the auxiliary carrying liquid which takes hold of the water brought in by the ester and leads it away into a decanter in which said water owing to its being insoluble in ether is separated without difficulty, even in the presence of soluble volatile impurities.

The applicant has found that the said process is applicable to those solutions of acetic acid and, possibly, of anhydride, which include strong proportions of an acetic ester, such as are obtained for example by extraction of aqueous acetic solutions or by oxidation of acetaldehyde in the presence of ethyl acetate. In such events, the same ester as that contained in the feed mixture is employed as a constituent of the carrying liquid.

However, in this case it is indispensable to make provisions, in the course of distillation, for discarding the ester continuously brought in by the starting material. To bring about such elimination, one should not venture to think of extracting the excess ester in the usual decanter connected with the top of the column, as is commonly practiced in all the processes of azeotropic dehydration employing an ester solely, for there would thus be determined through the column, condenser and decanter a continuous flux of ester which would prevent the formation of the two operative zones featuring the invention and there would then be lost the benefit of the preponderant presence, in the decanter, of the insoluble auxiliary carrying liquid.

According to the invention, the difficulty is resolved by withdrawing the excess ester, preferably in liquid state, from the median zone in which the ester operates alone, that is to say, at a point where the liquid which boils on the column plates contains no auxiliary carrying liquid. It is advantageous to effect such withdrawal of ester on a plate of increased capacity specially provided in the zone and constituting a reserve of liquid.

The product thus withdrawn is hydrated ester. It may be either re-employed directly as a solvent when it is dealt with the extraction of acetic acid from its diluted solutions, or preliminarily dehydrated by distillation or any other means when the treated liquid results from the oxidation of acetaldehyde in the presence of ethyl acetate according to known processes.

The following examples, together with the accompanying drawing are given for the purpose of illustration but not of limitation, in order to show how the invention may be readily carried into practical effect.

Example I

Into a column A provided with a condenser B and decanter C, and charged once for all, in accordance with the aforesaid U. S. A. patent application, with a suitable quantity of ethyl acetate and a selected volatile oil boiling between 84° and 85° C., there is introduced through the pipe I a mixture constituted by:

| | Percent |
|---|---|
| Actetate of ethyl | 82 |
| Acetic acid | 10 |
| Water | 8 | resulting from the extraction of a diluted acetic solution by means of ethyl acetate, according to known processes.

The apparatus being normally operated, there are formed in the column A, as set forth in the aforesaid patent application, two zones a and b in which respectively operate: the ethyl acetate, on the one hand, and the volatile oil, on the other hand. The water is separated by decantation in the decanter C and eliminated through the pipe 3. Through the pipe 6 there is withdrawn from the median portion of the zone a a quantity of liquid regulated by means of the valve 6' and corresponding to the quantity of ethyl acetate introduced into the column A by the mixture supply. The liquid withdrawn at 6 and cooled at H is extracted from the apparatus through the pipe 9 and valve 9' and, possibly after decantation, is then immediately reintroduced into the extraction battery.

Anhydrous acetic acid is withdrawn at 5 from the foot of column A.

Example II

There is introduced into the column A through the pipe I a mixture constituted by:

| | Per cent |
|---|---|
| Ethyl acetate | 64.5 |
| Water | 3.9 |
| Acetic acid | 10.6 |
| Acetic anhydride | 21.0 |

The column A being normally operated, there is withdrawn through the pipe 6 and valve 6' a quantity of ethyl acetate corresponding to that brought in by the feed. This liquid, which besides ethyl acetate includes a small quantity of water, is cooled at H and then introduced into the decanter D, wherein it is separated into two layers which consists of a heavier layer, mainly water and a lighter layer, an azeotropic layer. The watery layer would pass to E where the water would pass off at 7 and the lighter fraction would pass to G. The lighter layer from D would pass to F whence ethyl acetate contained therein would pass off at 8 and the lighter ingredients would join those from E passing into G. The condensed ingredients in G would either return to D to go through the operation again or return to E to go through the cycle from that point again.

The temperature of the coils at the bottom of both E and F would be adjusted so that the vapors passing out of the towers E and F would condense in G breaking down some of the azeotropic mixtures entering the towers so that as they trickled downwardly to D they would stratify upon reaching D.

Nor will the spirit of the invention be departed from if the withdrawn ester is dehydrated by means other than the distillation. For example, such ester may be treated directly in a small washing tower containing any dehydrating agent.

Finally, without departing from the scope of the invention, a special plate may be provided in the zone $a$ to permit of the liquid to be decanted in the hot way within the column itself, according to the arrangement described in the French Patent No. 832,892. In this case, there will be withdrawn through the pipe 6 the upper layer obtained by hot decantation, that is to say, a product highly enriched in ester which a mere boiling in one smaller column will suffice to thoroughly dehydrate.

It may also be found advantageous to extract, besides the upper layer decanted in the hot way, a certain proportion of aqueous layer which after distillation to recover the ester dissolved therein is discarded, thereby relieving the main column from supplemental burden of operation.

I claim:

1. A continuous process for producing an anhydrous acetic acid from a solution comprising a major portion of an acetic ester and aqueous acetic acid which comprises introducing the solution into the middle part of a distilling zone containing predetermined proportions of the same acetic ester and a water-insoluble water entraining oil adapted to form with water an azeotropic mixture of lower boiling point than the azeotropic mixture of said ester and water, heating the distilling zone at an end thereof whereby a temperature gradient is set up in said zone forming therein a section of operation for the acetic ester and a section more remote from the heated end for said water-insoluble water entraining oil; withdrawing the vapor from the end remote from the heated end, condensing the vapors, separating the non-aqueous constituent from the condensed vapors and returning the same to the entraining liquid section; withdrawing liquid containing a predominant percentage of said acetic ester from the acetic ester section of the distilling zone substantially at the same rate as the acetic ester is fed to the distilling zone in the form of a component of said solution, and withdrawing anhydrous acetic acid from the distilling zone at a point adjacent the heated end thereof.

2. The process of claim 1, further comprising cooling the liquid withdrawn from the ester operation section of the first distilling zone, decanting said liquid into two layers; and separately distilling said layers to recover anhydrous acetic ester.

3. The process of claim 1, further comprising dehydrating the liquid withdrawn from the ester operation section of the first distilling zone, to recover anhydrous acetic ester.

4. A continuous process for producing an anhydrous acetic liquid from a solution comprising a major portion of an acetic ester and aqueous acetic acid which process comprises introducing the solution into the middle part of a distilling zone containing predetermined proportions of the same acetic ester and a water insoluble water entraining oil adapted to form with water an azeotropic mixture of lower boiling point than the azeotropic mixture of said ester and water, said oil being insoluble in water; heating the distilling zone at an end thereof to set up in the same a temperature gradient from said end to the opposite end thereby forming in the zone two separate sections of operation for the ester and the entraining oil respectively, the entraining oil section being adjacent to said opposite end; withdrawing vapors from said opposite end and condensing them; separating from the condensed vapors the non-aqueous constituent thereof and returning the same to the entraining oil section of the distilling zone; causing the liquid in the ester operation section of the distilling zone to decant, thereby forming two layers, one of which consists largely of acetic ester; withdrawing the latter layer from the distilling zone substantially at the same rate as the acetic ester is fed to the distilling zone in the form of a component of said solution; boiling said layer to dehydrate it; and withdrawing anhydrous acetic liquid from the distilling zone at a point adjacent the heated end thereof.

5. A continuous process for producing anhydrous acetic acid from a solution consisting largely of ethyl acetate and of aqueous acetic acid, which comprises introducing the solution into the middle part of a distilling zone containing ethyl acetate and an oil having a boiling range of 84–85° C.; heating the distilling zone at an end thereof to set up in the same a temperature gradient from said end to the opposite end thereby forming in the zone two separate sections of operation for the ethyl acetate and the said oil respectively, the said oil section being adjacent to said opposite end, withdrawing vapors from said opposite end and condensing them; separating from the condensed vapors the non-aqueous constituent thereof and returning the same to the entraining oil operation section of the distilling zone; withdrawing liquid from the ethyl acetate section of the distilling zone, substantially at the same rate as ethyl acetate is fed to the distilling zone in the form of a component of the solution; and withdrawing anhydrous acetic acid from the distilling zone at a point adjacent the heated end thereof.

HENRI MARTIN GUINOT.